US010311075B2

(12) United States Patent
Kanellos et al.

(10) Patent No.: US 10,311,075 B2
(45) Date of Patent: Jun. 4, 2019

(54) REFACTORING OF DATABASES TO INCLUDE SOFT TYPE INFORMATION

(71) Applicant: International Business Machines Corporation, Armonk, NY (US)

(72) Inventors: Nicholas Kanellos, Ottawa (CA); Jonathan Limburn, Hampshire (GB); Ivan M. Milman, Austin, TX (US); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 14/562,138

(22) Filed: Dec. 5, 2014

(65) Prior Publication Data

US 2015/0169715 A1 Jun. 18, 2015

(30) Foreign Application Priority Data

Dec. 13, 2013 (GB) .................................. 1322053.8

(51) Int. Cl.
*G06F 16/25* (2019.01)

(52) U.S. Cl.
CPC .................................. *G06F 16/254* (2019.01)

(58) Field of Classification Search
None
See application file for complete search history.

(56) References Cited

U.S. PATENT DOCUMENTS 5,999,918 A * 12/1999 Williams ............... G06Q 40/00 702/179
6,366,934 B1 * 4/2002 Cheng ............... G06F 17/30011 707/999.2
6,611,843 B1 * 8/2003 Jacobs .............. G06F 17/30595
8,375,018 B2 2/2013 Castro et al.
8,468,171 B2 6/2013 Nishiyama
8,676,772 B2 * 3/2014 Gislason ........... G06F 17/30339 707/696
2002/0078068 A1 * 6/2002 Krishnaprasad .. G06F 17/30595
2002/0161778 A1 * 10/2002 Linstedt ............ G06F 17/30563
2002/0169788 A1 * 11/2002 Lee .................. G06F 17/30595

(Continued)

OTHER PUBLICATIONS

"Key value pairs in relational database", Stack Overflow, http://stackoverflow.com/questions/126271/key-value-pairs-in-relational-database, copyright 2014 stack exchange inc, 6 pages.

(Continued)

*Primary Examiner* — Mariela Reyes
*Assistant Examiner* — Edward Jacobs
(74) *Attorney, Agent, or Firm* — Robert Bunker; Edell, Shapiro & Finnan, LLC

(57) ABSTRACT

Method and system are provided for refactoring of databases to include soft type information. The method may include: carrying out data profiling of soft type data to generate an attribute list with mapping suggestions to a hardened database structure; generating a data model definition and extract, transform, and load logic for transforming the soft type data based on the attribute list and mapping suggestions; executing the data model definition to create a new or modified database structure; moving data from an existing database structure to the new or modified database structure; and regenerating a services interface for access to the data.

25 Claims, 4 Drawing Sheets

(56) References Cited

U.S. PATENT DOCUMENTS

2003/0140308 A1* 7/2003 Murthy ............. G06F 17/30917 715/234
2004/0128296 A1* 7/2004 Krishnamurthy ............................ G06F 17/30595
2004/0148278 A1* 7/2004 Milo ................... G06F 17/2205
2005/0050068 A1* 3/2005 Vaschillo .......... G06F 17/30569
2005/0234906 A1* 10/2005 Ganti ................ G06F 17/30569
2007/0074155 A1* 3/2007 Ama ................. G06F 17/30563 717/106
2008/0091720 A1* 4/2008 Klumpp .................... G06F 8/10
2008/0281849 A1* 11/2008 Mineno ............. G06F 17/30566
2009/0012983 A1 1/2009 Senneville et al.
2009/0198727 A1 8/2009 Duan et al.
2009/0327324 A1 12/2009 Laflen et al.
2010/0174720 A1 7/2010 Mack
2010/0228749 A1* 9/2010 Castro ............... G06F 17/30448 707/755
2010/0318498 A1* 12/2010 Swarnakar ........ G06F 17/30339 707/693
2011/0004638 A1* 1/2011 Nishiyama ........ G06F 17/30286 707/812
2011/0055147 A1* 3/2011 Joerg .................... G06F 9/4843 707/602
2011/0125705 A1* 5/2011 Aski ......................... G06F 8/30 707/602
2011/0282835 A1* 11/2011 Cannon ............. G06F 17/30079 707/622
2012/0265726 A1* 10/2012 Padmanabhan ....... G06F 17/303 707/602
2013/0086091 A1* 4/2013 Swarnakar ........ G06F 17/30339 707/755
2013/0124545 A1 5/2013 Holmberg et al.
2013/0166568 A1 6/2013 Binkert et al.
2015/0046455 A1* 2/2015 Bi ..................... G06F 17/30598 707/737

OTHER PUBLICATIONS

"Database for key value pairs", Stack Overflow, http://stackoverflow.com/questions/10374921/database-for-key-value-pairs?rq=1, copyright 2014 stack exchange inc, 1 page.

"Better way of storing key-value pairs in the database?", Programmers Stack Exchange, http://programmers.stackexchange.com/questions/185446/better-way-of-storing-key-value-pairs-in-the-database, copyright 2014 stack exchange inc, 2 pages.

"Fourth-generation programming language", http://en.wikipedia.org/wiki/4GL, Mar. 2013, Dec. 5, 2014 https://en.wikipedia.org/wiki/Fourth-generation_programming_language.

* cited by examiner

REFACTORING OF DATABASES TO INCLUDE SOFT TYPE INFORMATION

BACKGROUND

This invention relates to the field of database technology. In particular, the invention relates to refactoring of databases to include soft type information.

In many instances, database modelers use a “soft type” to represent attributes of an entity, or even entities. Soft type refers to the convention of storing an attribute as a tuple consisting of <key, tag, value>.

For example, a database table of Employees might look like this:

TABLE 1

| Id | Name | Department | Phone Number | Email |
|---|---|---|---|---|
| 1 | Judith Hall | 76H | 512-555-1234 | jhall@example.com |
| 2 | Chuck Riegle | 76H | 512-555-6780 | criegle@example.com |
| 3 | Art Vandelay | 98G | 408-555-0987 | art@example.com |
| 4 | Biff Loman | 12P | 313-555-0654 | bloman@example.com |

To add some new attributes, rather than extending the current table, or creating a new table, a soft type table could be used. For example, if a user wanted to add attributes for employee type and salary, a single table could be used like this:

TABLE 2

| Id | Tag | Value |
|---|---|---|
| 1 | Employee Type | Full Time |
| 1 | Salary | 60,000 |
| 2 | Salary | 19,000 |
| 2 | Employee Type | Part Time |

There are many reasons why a soft type table might be used instead of extending the Employees table.

The database could be deployed in production with a much larger population of employees, with many applications using the database with the above schema. Changing the schema could impact all the applications.

At the time the database was designed, not all the attributes may have been known, or the range of values may not have been known. So the designer may have elected to store additional attributes in a soft-type table.

In addition to the <key, tag, value> approach to modeling soft types, a number of applications leverage the relational database capability to process Extensible Markup Language (XML) data for a similar approach. For example, in some enterprise relational database products a hybrid query language able to process pure Structured Query Language (SQL), pure XQuery, and hybrid queries (SQL with embedded XQuery snippets or XQuery with embedded SQL snippets) has been introduced alongside a native XML data type. This XML capability has been exploited for example by systems leveraging the relational database, for example, a Master Data Management system utilizes this capability to manage a “soft schema” which is essentially an XML column in the database. These products can then take advantage of a huge degree of flexibility by storing a piece of XML alongside the schema for the XML document. While this allows a flexible introduction of new attributes without changing the data model and the services access layer, this has severe negative impact regarding search capabilities and query performance.

For example, when querying amongst tables having XML columns, the semantics of the search is counter-intuitive for queries containing more than one condition that must be extant simultaneously. An entity (such as a person or a product object when considering an application that takes advantage of this capability) may have two separate XML documents describing their characteristics. An Xquery that searches across two or more XML documents simultaneously may not yield the results that were intended. Properly created queries such as these are complex and extremely expensive in SQL databases.

Soft type tables also have issues with: data integrity (soft types have to be able to store any value) and performance: As noted with XML queries, joining soft type data is an expensive operation, and that also gets worse over time as the table grows.

As the number of soft type elements grows, and these performance and security issue grow accordingly, developers typically will attempt to refactor the tables to move the soft types into a first class object (e.g. structured columns in tables). However, for production applications, there is no technology accelerator to refactor the tables, and more importantly, to automatically migrate the existing soft type data to the new structured column. Furthermore, any applications that depend on the existing soft type structure (such as those that provide data as a service) will have to be refactored as well.

SUMMARY

According to a first aspect of the present invention there is provided a method for refactoring of databases to include soft type information, comprising: carrying out data profiling of soft type data to generate an attribute list with mapping suggestions to a hardened database structure; generating a data model definition and extract, transform, and load logic for transforming the soft type data based on the attribute list and mapping suggestions; executing the data model definition to create a new or modified database structure; moving data from an existing database structure to the new or modified database structure; and regenerating a services interface for access to the data.

The method may include receiving user inputs of soft type information and configured thresholds for new attributes of a hardened form to be generated for the soft type information. The configured thresholds may be relative or absolute thresholds for the new attributes of the hardened form.

Executing the data model definition may create a new database structure with a foreign key relationship to the existing database structure with structured fields containing the soft type data. Alternatively, executing the data model definition may create a modified data structure based on an existing database structure adding structured fields containing the soft type data.

Carrying out data profiling of soft type data to generate an attribute list with mapping suggestions to a hardened database structure may include performing column analysis and applying statistics on frequency, uniqueness and value distribution of attributes.

Mapping suggestions to a hardened data structure may be provided in the form of new type of data structure with a foreign key relationship to the existing database structure with structured fields containing the soft type data. Alternatively, mapping suggestions to a hardened data structure may be provided in the form of a modified data structure based on an existing database structure adding structured fields containing the soft type data.

The method may include providing a user input for reviewing and modifying a generated attribute list with mapping suggestions.

In one embodiment, moving data from an existing database structure to the new or modified database structure may include moving data and generating a service wrapper to map inbound and outbound soft type to hard type structures and hard type to soft type structures.

In another embodiment, moving data from an existing database structure to the new or modified database structure may include moving data incrementally from a soft type to a hard type structure when a specific record is requested for read or write. The method may include providing an intercepting and rerouting mechanism for read and write requests to move the data from an existing database structure to the new or modified database structure.

The method may include providing feedback to a user on the suggested mapping in the form of colors indicating a level of confidence that the proposed mapping meets the user requirements.

According to a second aspect of the present invention there is provided a system for refactoring of databases to include soft type information, comprising: a soft type analysis component for carrying out data profiling of soft type data to generate an attribute list with mapping suggestions to a hardened database structure; a data model definition component for generating a data model definition and extract, transform and load logic for transforming the soft type data based on the attribute list and mapping suggestions; an execution component for executing the data model definition to create a new or modified database structure; a logic component for moving data from an existing database structure to the new or modified database structure; and a regeneration component for regenerating a services interface for access to the data.

The system may include a user interface for receiving user inputs of soft type information and configured thresholds for new attributes of a hardened form to be generated for the soft type information. The configured thresholds may be relative or absolute thresholds for the new attributes of the hardened form.

The execution component for executing the data model definition may create a new database structure with a foreign key relationship to the existing database structure with structured fields containing the soft type data. Alternatively, the execution component for executing the data model definition may create a modified data structure based on an existing database structure adding structured fields containing the soft type data.

The soft type analysis component for carrying out data profiling of soft type data to generate an attribute list with mapping suggestions to a hardened database structure may includes performing column analysis and applying statistics on frequency, uniqueness and value distribution of attributes.

Mapping suggestions to a hardened data structure may be provided in the form of new type of data structure with a foreign key relationship to the existing database structure with structured fields containing the soft type data. Alternatively, mapping suggestions to a hardened data structure may be provided in the form of an altered data structure based on an existing database structure adding structured fields containing the soft type data.

The user interface may provide for reviewing and modifying a generated attribute list with mapping suggestions.

In one embodiment, the logic component for moving data from an existing database structure to the new or modified database structure may include moving data and generating a service wrapper to map inbound and outbound soft type to hard type structures and hard type to soft type structures. In another embodiment, the logic component for moving data from an existing database structure to the new or modified database structure may include moving data incrementally from a soft type to a hard type structure when a specific record is requested for read or write.

The user interface may provide feedback to a user on the suggested mapping in the form of colors indicating a level of confidence that the proposed mapping meets the user requirements.

According to a third aspect of the present invention there is provided a computer program product for refactoring of databases to include soft type information, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

An embodiment of the present invention may improve the performance of search queries of soft types by refactoring database structures. Data as a service (using web services to access the underlying data) can seamlessly access the data whether or not it is stored as tag-value pairs or as a first class database object.

BRIEF DESCRIPTION OF THE SEVERAL VIEWS OF THE DRAWINGS

Preferred embodiments of the present invention will now be described, by way of example only, with reference to the drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for refactoring of databases for soft types. In databases, a database structure such as a table has first class objects defined in it (for example, in structured columns in the table). In addition, soft type refers to the convention of storing an attribute as a tuple consisting of <key, tag, value> with the key referencing a data item in the structure. The described method and system provide for the refactoring of a database structure to include soft type data.

Figure 1:
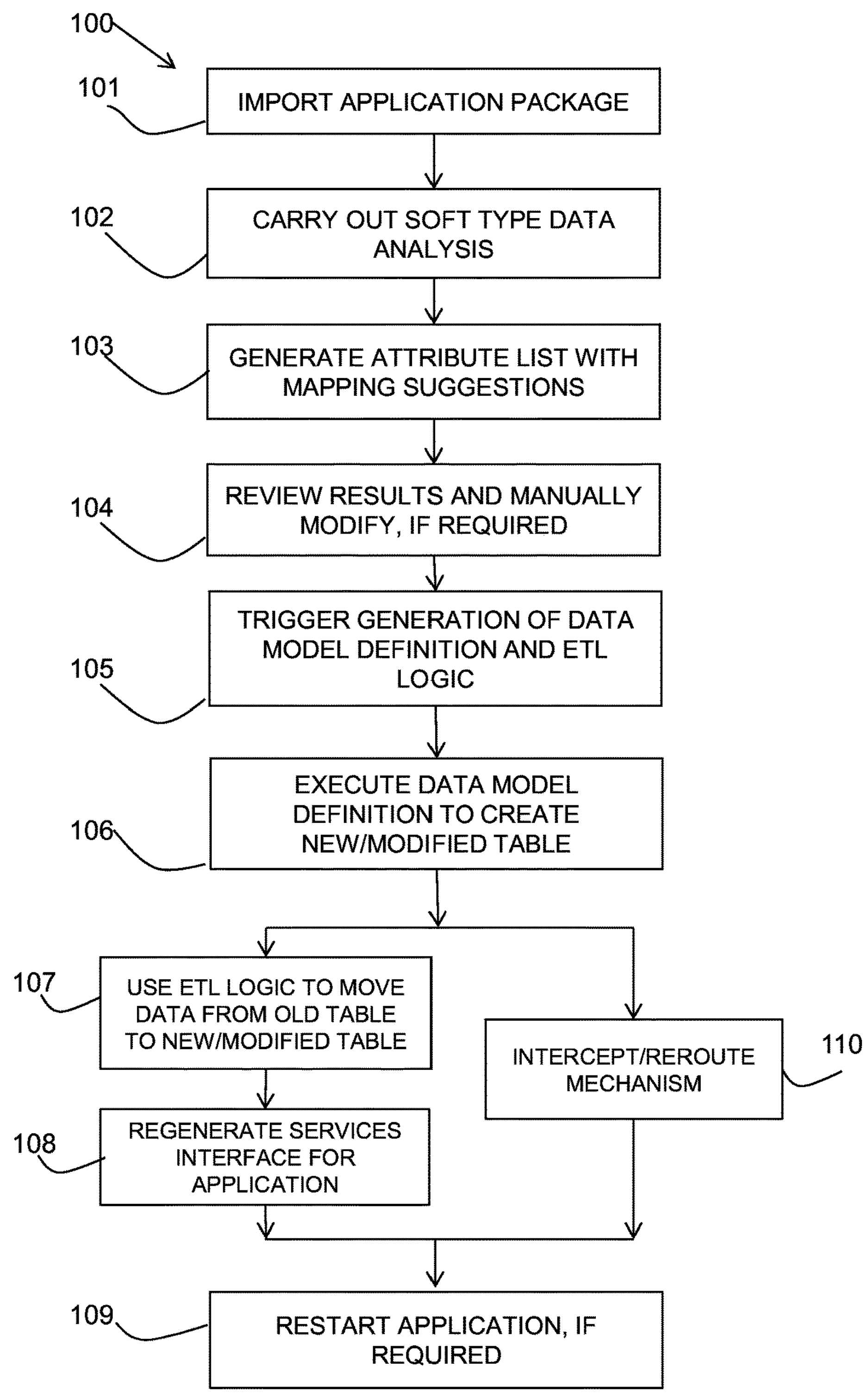
FIG. 1 is a flow diagram of an example embodiment of a method in accordance with the present invention.

Referring to FIG. 1, a flow diagram 100 shows an example embodiment of the described method.

An application package containing existing database schema may be imported 101 and a soft type data analysis may be carried out 102.

A user interface tool may be provided to manage the import of the application package and also enable a user to input values and soft type information including configuring thresholds for a hardened form to be generated for the soft type information. This is described further in relation to FIG. 3 below.

For tables containing soft types, data profiling may be performed with a capability to identify a feasible selection of structured attributes and to return 103 the result with a proposed mapping. This proposed mapping may include an attribute list.

The data profiling capability for the soft types may be explained further using the data example from the background section. The table with soft types may be as follows:

TABLE 3

| Id | Tag | Value |
|---|---|---|
| 1 | Employee Type | Full Time |
| 1 | Salary | 60,000 |
| 2 | Salary | 19,000 |
| 2 | Employee Type | Part Time |

Current data profiling tools are able to perform column analysis which in the example shown would yield information such as:

ID column: unique value set;

Tag column: non-unique and many tags like "employee type" are frequently re-occurring (same "symptom" as using a reference table to back an attribute in a data table) and have a relatively small number of distinct values;

Value column: Large number of distinct values—not necessarily unique.

With statistics on frequency, uniqueness and value distribution, the described profiling algorithm suggests the following new attributes. These may be based on configurable thresholds which may be relative (e.g. if found in 5% of the records) or absolute (if found more often than 1000 times):

Column 1—Employee Type;

Column 2—Salary.

Depending on the configuration of the algorithm, the described data profiling algorithm may suggest either a new type with a foreign key relationship to the existing table with structured fields also containing the soft types or an altered table based on the existing table adding these fields.

An application developer may review 104 the results and modify them as needed and approve the attribute list and mapping.

Generation of a data model definition may be triggered 105 (in SQL terms, this is the DDL script) as well as the necessary Extract Transform and Load (ETL) logic required to physically move the data from the old table structures to the new table structure. Once the data model definition is executed 106, the new/modified table is created in the database.

The generated ETL logic may now physically move 107 the data from the old table to the new table.

The application developer may then choose to regenerate 108 the services interface of the application again and re-deploys the new application with transparent access for the consumers to the application tier.

Generically speaking, in this step a service wrapper is generated for the existing web services to map inbound and outbound the soft type to hard type structures and vice versa. In one embodiment, this may be done with behavior extension code which may be generated for the existing web services. These behavior extensions allow pre and post transaction to wrap around the existing services and transform the previous soft type structure into the hardened form and vice versa. The purpose of this service wrapper is to intercept the original calls to the soft type and provide a route to persist the data within its new hardened form.

There may be cases where the regeneration of the persistency layer moving the data from the old to the new structure might not be feasible—maybe due to the size of data or characteristics of the unused hardware capacity, etc. In this case, an intercept/reroute mechanism 110 may be used instead of the ETL logic of step 107 and regeneration 108 using a service wrapper. The intercept/reroute mechanism may incrementally move the records from the old soft type to the new hard type structure whenever a specific record is requested for read or write purposes where at the end of the service call the record is transformed and persisted in the new hard type model in case the record was not yet there before the service was called.

The application may need to be restarted 109; however, in some applications this may not be required.

Figure 2:
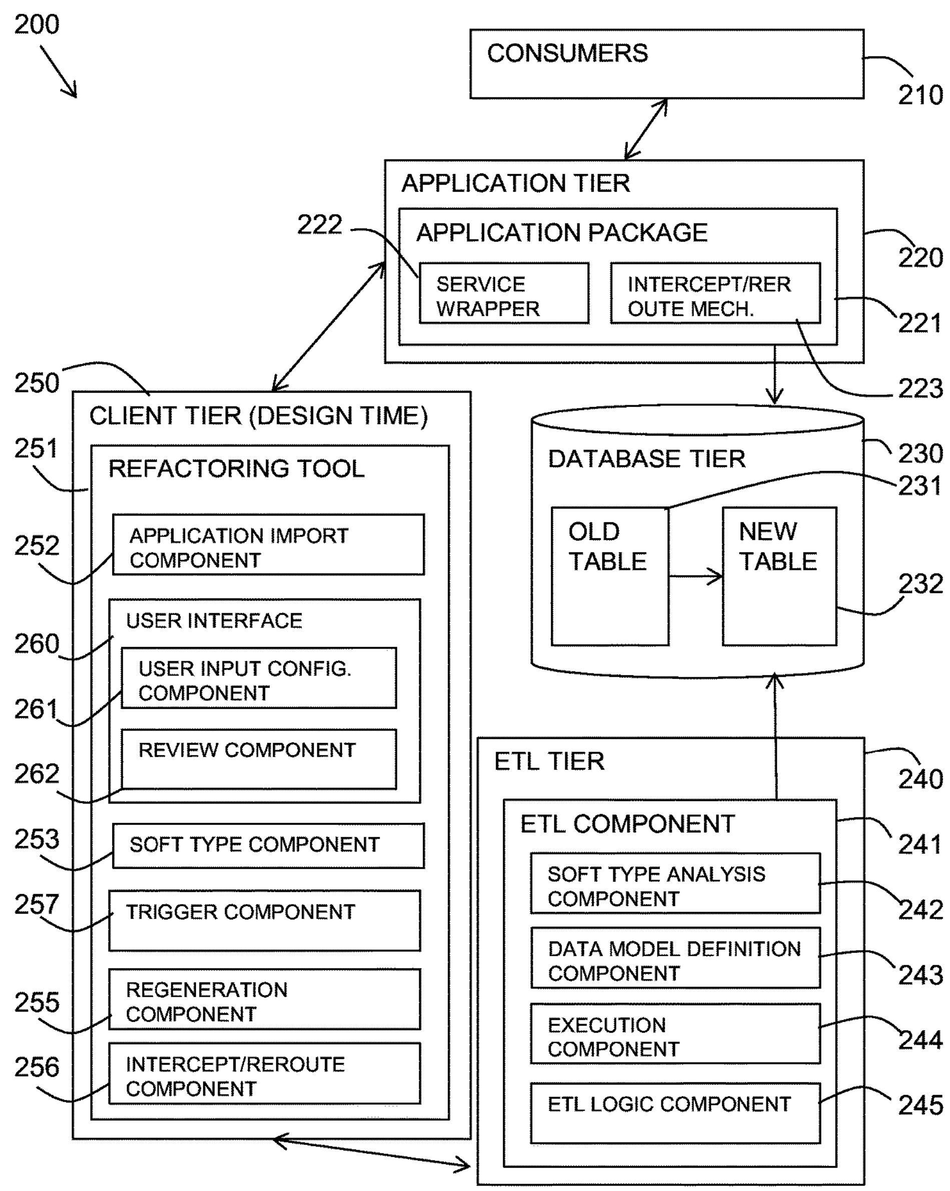
FIG. 2 is a block diagram of an example embodiment of a system in accordance with the present invention including illustrating a flow of the method of FIG. 1.

Referring to FIG. 2, a block diagram shows an example embodiment of the described system 200. The described system architecture works on high level.

A database tier 230 may include an existing table 231 and a new or modified table 232 which may be created during the described method.

An application tier 220 for consumers 210 may provide an application package 221 that contains an existing database schema with access to the database tier 230.

A client tier 250 may be provided with the described functionality in the form of a refactoring tool 251. An ETL tier 240 may provide an ETL component 241 for the ETL generating logic for the refactoring tool 251.

The refactoring tool 251 of the client tier 250 may include an application import component 252 for importing an application package 221 from the application tier 220.

The refactoring tool 251 may include a user interface 260 which may include a user configuration input component 261 enabling the user to input values and soft type information including configuring thresholds for a hardened form to be generated. The user interface 260 may also include a review component 262 for reviewing the proposed attribute list and mapping for the soft type data generated by the ETL component 241.

The refactoring tool 251 may include a soft type component 253 for submitting soft types of the application package 221 to the ETL component 241 for analysis and for receiving a proposed attribute list and mapping from the ETL component 241. There may also be provided a triggering component 257 at the refactoring tool 251 for triggering the ETL component 241 to generate a data model definition and ETL logic once the proposed attribute list and mapping has been reviewed by the user.

In one embodiment, the refactoring tool 251 may include a regeneration component 255 for regenerating a services interface or service wrapper 222 of the application package 221 for transparent access for the consumers 210 to the application package 221 and the database tier 230.

In an alternative embodiment, a regeneration component may be in the form of an intercept and reroute generating component 256 which may be provided at the refactoring tool 251 for providing an intercept and reroute component 223 at the application package 221.

The ETL component 241 of the ETL tier 240 may include a soft type analysis component 242 for performing data profiling to identify a feasible selection of structured attributes and a proposed mapping. The ETL component 241 may also include a data model definition component 243 for generating a data model and ETL logic.

The ETL component 241 may also include an execution component 244 for executing the data model definition to generate the new or modified table 232 in the database tier 230. The execution component 244 may be triggered by the refactoring tool 251.

An ETL logic component 245 may physically move the data from the existing table 231 to the new or modified table 232, alternatively, this may be done incrementally during read or write requests.

A generic example of this solution may be implemented in a Master Data Management system. Typically the configuration of the database structure would therefore be done by the associated configuration tooling applicable for that Master Data Management system. An explicit implementation of this solution may be implemented within the IBM InfoSphere (IBM and InfoSphere are trade marks of International Business Machines Corporation) portfolio. The MDM Workbench provides an Eclipse based environment for the management of an MDM system. A series of wizards may be used to manipulate the MDM system, capturing user input to generate artifacts necessary to manipulate the structure of the MDM data model and related services.

The MDM Workbench capability can be extended to provide a wizard that would walk the user through the steps required to transform a soft spec into a hardened representation in the data model.

Figure 3:
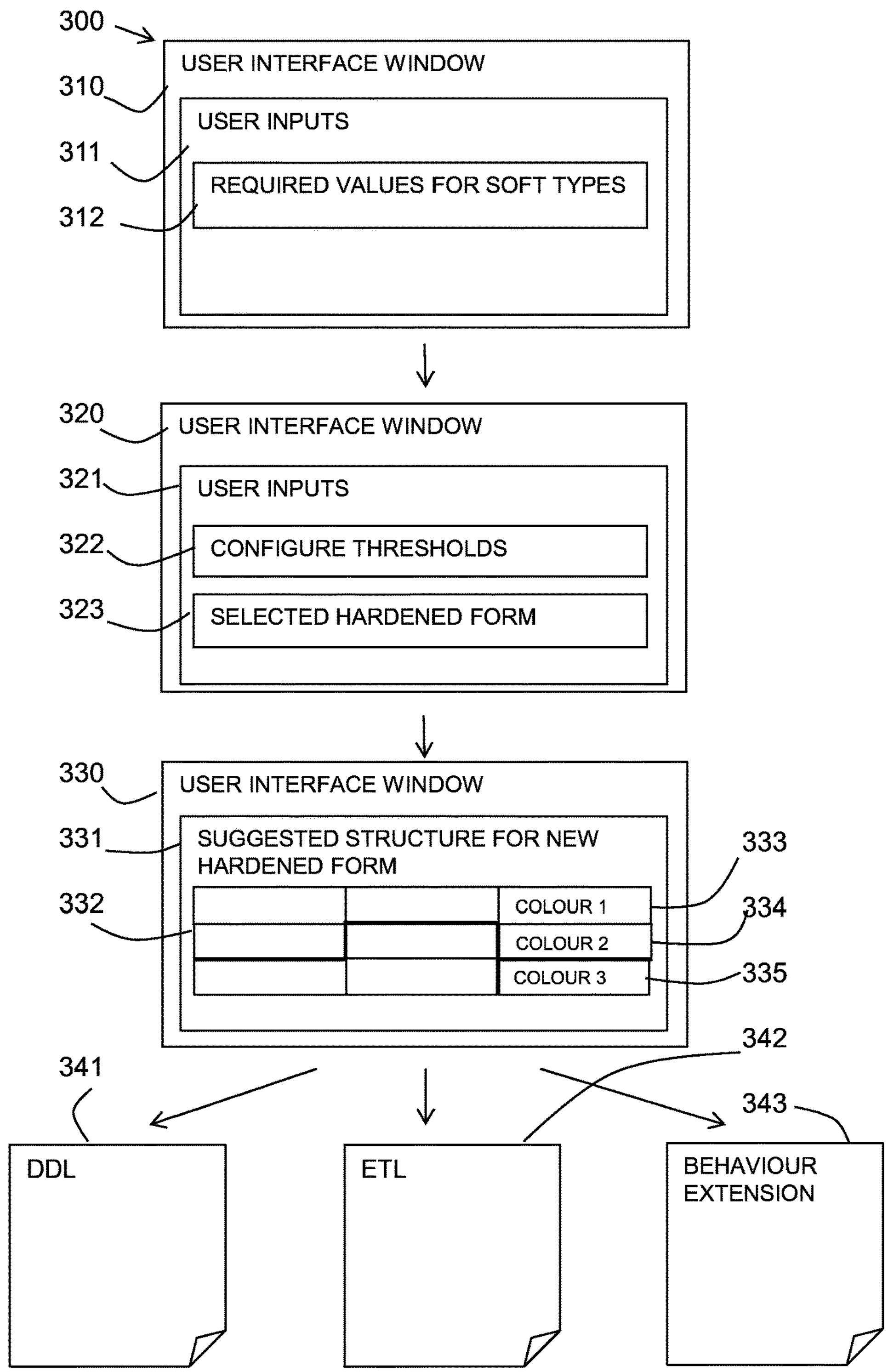
FIG. 3 is a schematic diagram of a user interface in accordance with an aspect of the present invention.

Referring to FIG. 3, a schematic diagram 300 shows an example embodiment of user interface windows 310, 320, 330 used in the described method and system.

A user may initiate a wizard to guide them through the process of transforming a soft type into a hardened representation. The user may input required values including the soft type information. A first user interface window 310 shows options for user inputs 311 of required values for soft types 312.

The user configures thresholds that determine the level of ambiguity that can be applied to the transformation of the profiling information. The user may also determine the hardened form of the soft type, whether it be extensions to an existing table or whether it be a new table with a foreign key relationship. A second user interface window 320 shows further options for user inputs 321 of configured thresholds 322 and a selected hardened form 323.

The algorithm may then use these thresholds to determine a suggested structure for the new hard type. Colors may be used in the wizard indicating the level of confidence that the algorithm has identified the required structure correctly. A third user interface window 330 shows a suggested structure 331 for a new hardened form in the form of a structure 332 with colored entries 333, 334, 335 indicating a level of confidence of the entries.

The workbench generates the artifacts required to make this change to the application.

A data model definition 341 is generated that will manipulate the underlying database to create a representation of the new hard type, and where required remove the representation of the soft type.

An ETL logic job 342 may be generated to allow migration of existing data stored in the database from its present soft type form into the new hardened representation.

A service wrapper may be generated for the existing web services to map inbound and outbound the soft type to hard type structures and vice versa. In this example, this may be done with behavior extension code 343 which may be generated for the existing web services.

Simplification of refactoring provides: intelligent creation of a first class database entity from a soft-type; intelligent model generation for structured first class entity; and intelligent model-driven tools to migrate the data from the soft-type table to the first class database entity.

Maintenance of existing service interfaces is provided with automatic update of data as a service implementation to use the new first class entity rather than the soft type.

Figure 4:
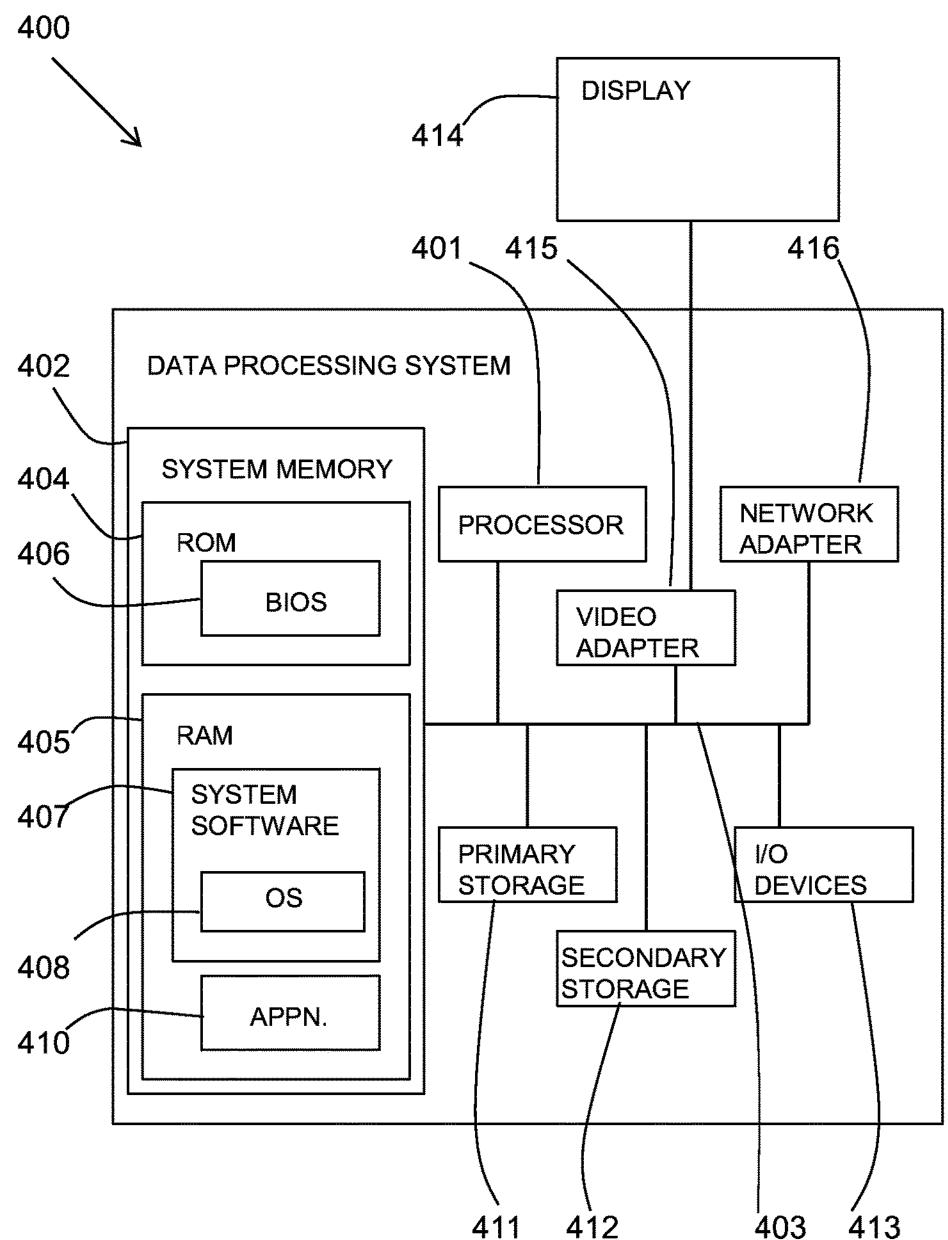
FIG. 4 is a block diagram of an embodiment of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A computer-implemented method for refactoring a database, comprising:

profiling soft type data to generate an attribute list and one or more mapping suggestions for mapping the soft type data to another database structure, wherein the soft type data include data stored in a database table external of a defined database table to extend the defined database table to include additional attributes without modifying a definition of the defined database table, wherein the soft type data in the external database table includes one or more tuples each corresponding to an additional attribute and comprising a value for the additional attribute and a row identifier indicating a row in the defined database table associated with the additional attribute, and wherein profiling the soft type data to generate an attribute list and one or more mapping suggestions to another database structure includes:

performing column analysis on the soft type data and applying statistics on frequency, uniqueness and value distribution of attributes to determine additional columns present in the soft type data extending the defined database table;

generating a data model definition and extract, transform, and load logic for transforming the soft type data based on the attribute list and at least one of the one or more mapping suggestions;

executing the data model definition to create a target database structure incorporating the additional columns as structured columns into one or more defined database tables, wherein the additional columns are directly accessible by a query in a relational structured query language specifying the additional columns and received by the database from an external application;

moving data from an existing database structure to the target database structure, wherein moving data from the existing database structure to the target database structure includes:

processing requests by one or more external applications for data records by performing an access operation to access the requested data records from soft type data within the external database table; and moving data records of soft type data incrementally from the external database table to the additional structured columns of the one or more defined database tables of the target database structure as each data record is requested, wherein each data record is transformed from the soft type data to hard type data and stored in the target database structure after the access operation for that data record; and providing access to the soft type data within the defined database tables of the target database structure.

2. The method of claim 1, further comprising:

receiving user inputs of soft type information and configured thresholds for new attributes of a hardened form to be generated for the soft type information.

3. The method of claim 2, wherein the configured thresholds are a selected one of relative thresholds and absolute thresholds for the new attributes of the hardened form.

4. The method of claim 1, wherein executing the data model definition further creates a new database structure with a foreign key relationship to a corresponding existing database structure with one or more structured fields containing the soft type data.

5. The method of claim 1, wherein the target database structure includes a modified database structure with at least one structured field added to contain the soft type data.

6. The method of claim 1, wherein the one or more mapping suggestions comprises a new type of database structure with a foreign key relationship to the existing database structure with at least one structured field containing the soft type data.

7. The method of claim 1, wherein the one or more mapping suggestions to another database structure comprises modifying a database structure to add one or more structured fields containing the soft type data.

8. The method of claim 1, further comprising providing a user input for reviewing and modifying the generated attribute list and one or more mapping suggestions.

9. The method of claim 1, further including providing an intercepting and rerouting mechanism for read and write requests to move the data from the existing database structure to the target database structure.

10. The method of claim 1, further including providing feedback to a user on a suggested mapping in the form of a color indicating a level of confidence that the mapping meets user requirements.

11. A system for refactoring a database, comprising:

at least one hardware processor configured to:

profile soft type data to generate an attribute list and one or more mapping suggestions for mapping the soft type data to another database structure, wherein the soft type data include data stored in a database table external of a defined database table to extend the defined database table to include additional attributes without modifying a definition of the defined database table, wherein the soft type data in the external database table includes one or more tuples each corresponding to an additional attribute and comprising a value for the additional attribute and a row identifier indicating a row in the defined database table associated with the additional attribute, and wherein profiling the soft type data to generate an attribute list and one or more mapping suggestions to another database structure includes:

performing column analysis on the soft type data and applying statistics on frequency, uniqueness and value distribution of attributes to determine additional columns present in the soft type data extending the defined database table;

generate a data model definition and extract, transform, and load logic for transforming the soft type data based on the attribute list and at least one of the one or more mapping suggestions;

execute the data model definition to create a target database structure incorporating the additional columns as structured columns into one or more defined database tables, wherein the additional columns are directly accessible by a query in a relational structured query language specifying the additional columns and received by the database from an external application;

move data from an existing database structure to the target database structure, wherein moving data from the existing database structure to the target database structure includes:

processing requests by one or more external applications for data records by performing an access operation to access the requested data records from soft type data within the external database table; and moving data records of soft type data incrementally from the external database table to the additional structured columns of the one or more defined database tables of the target database structure as each data record is requested, wherein each data record is transformed from the soft type data to hard type data and stored in the target database structure after the access operation for that data record; and provide access to the soft type data within the defined database tables of the target database structure.

12. The system of claim 11, wherein the at least one hardware processor is further configured to:

receive user inputs of soft type information and configured thresholds for new attributes of a hardened form to be generated for the soft type information.

13. The system of claim 12, wherein the configured thresholds are a selected one of relative thresholds and absolute thresholds for the new attributes of the hardened form.

14. The system of claim 11, wherein executing the data model definition further creates a new database structure with a foreign key relationship to a corresponding existing database structure with one or more structured fields containing the soft type data.

15. The system of claim 11, wherein the target database structure includes a modified database structure with at least one structured field added to contain the soft type data.

16. The system of claim 11, wherein the one or more mapping suggestions comprises a new type of database structure with a foreign key relationship to the existing database structure with at least one structured field containing the soft type data.

17. The system of claim 11, wherein the one or more mapping suggestions to another database structure comprises modifying a database structure to add one or more structured fields containing the soft type data.

18. The system of claim 11, wherein the at least one hardware processor is further configured to:

provide a user input for reviewing and modifying the generated attribute list and one or more mapping suggestions.

19. A computer program product for refactoring a database, comprising:

a non-transitory computer readable storage medium having computer readable program code embodied therewith for execution on a processing system, the computer readable program code comprising computer readable program code configured to:

profile soft type data to generate an attribute list and one or more mapping suggestions for mapping the soft type data to another database structure, wherein the soft type data include data stored in a database table external of a defined database table to extend the defined database table to include additional attributes without modifying a definition of the defined database table, wherein the soft type data in the external database table includes one or more tuples each corresponding to an additional attribute and comprising a value for the additional attribute and a row identifier indicating a row in the defined database table associated with the additional attribute, and wherein profiling the soft type data to generate an attribute list and one or more mapping suggestions to another database structure includes:

performing column analysis on the soft type data and applying statistics on frequency, uniqueness and value distribution of attributes to determine additional columns present in the soft type data extending the defined database table;

generate a data model definition and extract, transform, and load logic for transforming the soft type data based on the attribute list and at least one of the one or more mapping suggestions;

execute the data model definition to create a target database structure incorporating the additional columns as structured columns into one or more defined database tables, wherein the additional columns are directly accessible by a query in a relational structured query language specifying the additional columns and received by the database from an external application;

move data from an existing database structure to the target database structure, wherein moving data from the existing database structure to the target database structure includes:

processing requests by one or more external applications for data records by performing an access operation to access the requested data records from soft type data within the external database table; and moving data records of soft type data incrementally from the external database table to the additional structured columns of the one or more defined database tables of the target database structure as each data record is requested, wherein each data record is transformed from the soft type data to hard type data and stored in the target database structure after the access operation for that data record; and provide access to the soft type data within the defined database tables of the target database structure.

20. The computer program product of claim 19, wherein the computer readable program code is further configured to:

receive user inputs of soft type information and configured thresholds for new attributes of a hardened form to be generated for the soft type information.

21. The computer program product of claim 20, wherein the configured thresholds are a selected one of relative thresholds and absolute thresholds for the new attributes of the hardened form.

22. The computer program product claim 19, wherein executing the data model definition further creates a new database structure with a foreign key relationship to a corresponding existing database structure with one or more structured fields containing the soft type data.

23. The computer program product of claim 19, wherein the one or more mapping suggestions comprises a new type of database structure with a foreign key relationship to the existing database structure with at least one structured field containing the soft type data.

24. The computer program product of claim 19, wherein the one or more mapping suggestions to another database structure comprises modifying a database structure to add one or more structured fields containing the soft type data.

25. The computer program product of claim 19, wherein the computer readable program code is further configured to:

provide a user input for reviewing and modifying the generated attribute list and one or more mapping suggestions.

* * * * *